United States Patent [19]
Miller

[11] Patent Number: 5,729,987
[45] Date of Patent: Mar. 24, 1998

[54] DESALINIZATION METHOD AND APPARATUS

[76] Inventor: Joel V. Miller, 14340 Trinidad Rd., San Leandro, Calif. 94577

[21] Appl. No.: 607,383

[22] Filed: Feb. 27, 1996

[51] Int. Cl.⁶ .................................................. F25D 17/02
[52] U.S. Cl. .................. 62/98; 62/238.5; 202/234; 203/10; 203/DIG. 4; 203/DIG. 17
[58] Field of Search ........................... 62/238.5, 175, 62/56, 79, 85, 98, 430; 202/233, 234; 203/10, DIG. 4, DIG. 17

[56] References Cited

U.S. PATENT DOCUMENTS

| | | | |
|---|---|---|---|
| 2,946,204 | 7/1960 | Justice | 62/238.5 |
| 4,003,798 | 1/1977 | McCord | 202/160 |
| 4,014,751 | 3/1977 | McCord | 62/238.5 |
| 4,278,502 | 7/1981 | Stevens et al. | 202/206 |
| 4,373,346 | 2/1983 | Hebert et al. | 62/79 |
| 4,463,575 | 8/1984 | McCord | 62/184 |
| 4,539,076 | 9/1985 | Swain | 202/154 |
| 4,664,751 | 5/1987 | Lloyd | 202/176 |
| 4,938,868 | 7/1990 | Nelson | 203/1 |
| 4,975,154 | 12/1990 | Palmer et al. | 203/1 |
| 5,207,875 | 5/1993 | Zakka et al. | 203/11 |
| 5,227,027 | 7/1993 | Topper | 203/10 |
| 5,232,556 | 8/1993 | Passerilli | 202/177 |
| 5,232,557 | 8/1993 | Kontu et al. | 202/182 |
| 5,331,824 | 7/1994 | Miller et al. | 62/175 |

*Primary Examiner*—John M. Sollecito
*Attorney, Agent, or Firm*—Robert Samuel Smith

[57] ABSTRACT

A method and apparatus for desalinizing salt water which includes pumping refrigerant vapor from a first reservoir to a second reservoir wherein pressure is maintained to condense refrigerant vapor pumped into said second reservoir to condense. Salt water admitted into a third reservoir in thermal contact with the second reservoir such that seawater in said third reservoir is evaporated and passes through a vapor trap into a fourth reservoir. The fourth reservoir is in thermal contact with the first reservoir such that heat generated by water vapor condensing in the fourth reservoir is absorbed by liquid refrigerant in the first reservoir such as to aid in evaporation of refrigerant to complete the refrigerant cycle.

12 Claims, 3 Drawing Sheets

DESALINIZATION METHOD AND APPARATUS

FIELD OF THE INVENTION

This invention relates to methods of desalinizing water and particularly to an apparatus using a refrigerant such as ammonia in a distillation process applied to desalinization of seawater.

BACKGROUND AND PRIOR ART

More than 56 million gallons of fresh water are consumed to maintain America's standard of living per lifespan of each person. Ironically, many areas of the world where the need for fresh water is the greatest is also where the desert land borders the ocean. which contains seven times too much salt to be potable. In view of this situation, many methods and apparatus have been disclosed for desalinizing salt water.

The technology of this invention are generally related to three fields. The first field is related to vapor generating and recovering apparatus,. The second field is refrigeration, and the third field is desalinization.

Vapor generation and recovery systems for the purpose of carrying out "degreasing operations have been used for many years. The first such apparatus used in this operation included an open vat with a heater in the bottom and cooling coils around the top rim. A solvent such as methylene chloride was placed in the vat. The solvent was heated by the heater causing the vat to be filled with a cloud of vapor. The cooling coil around the rim prevented the cloud from escaping. Distilled vapors would collect on the coiling coil and drip into a separate container and was used to spray parts to be cleaned which were hung on racks inside the vat. Solvent vapors would also condense on the parts hung in the vat as another means for rinsing off the parts.

U.S. Pat. No. 4,003,798 to Mc Cord discloses a vapor generating and recovering system which includes condensing coils and evaporating coils in heat transfer relationship with the vapor generating and recovering chamber. The chamber is divided into sections with separate coils for each section so as to achieve separation of the components of the solvent.

U.S. Pat. No. 4,278,502 to Stevens et al discloses a vapor generation and recovery system having a refrigeration unit in a chamber with three sections, one section above the other two and arranged to collect condensate and direct the condensate to drip back into the recovery section.

U.S. Pat. No. 4,373,346 to Hebert et al discloses a precooler heat exchanger and subcooler heat exchanger supplied with refrigerant of a refrigeration system. The precooler and subcooler are supplied by a water flow such as to maintain the refrigerant in its vapor saturated state.

U.S. Pat. No. 4,417,951 to Stanisic et al discloses a distiller and evaporator for sea water featuring a baffle system for separating evaporated steam from non evaporated water drops.

U.S. Pat. No. 4,463,575 to McCord discloses a vapor generating and recovery system featuring a refrigerating system with additional heat exchange means.

U.S. Pat. No. 4,539,076 to Swain discloses a vapor compression distillation apparatus having three heat exchangers for optimizing use of generated heat.

U.S. Pat. No. 4,938,868 to Nelson discloses generation of a vapor which is then treated by droplets of treated liquid which further expedites condensation of the vapor.

U.S. Pat. No. 4,975,154 to Palmer et al discloses a method of using measurements of conductivity of treated water to control admission of raw water to be treated.

U.S. Pat. No. 5,207,875 to Zapka et al discloses pre of seawater for more efficient distillation.

U.S. Pat. No. 5,227,027 to Topper discloses a water distillation system used in combination with a heat pump system wherein the distillation system includes a blow down operation for removing contaminants.

U.S. Pat. No. 5,232,556 to Parelli discloses a water desalinization apparatus with a heat exchange arrangement featuring a centrifugal compressor and reflow of brackish water through through thin walled tubes which discharges heat to the vacuum chamber as the brackish water is discharged.

U.S. Pat. No. 5,232 557 to Kontu et al discloses construction of heat transfer plates and condensation apparatus.

U.S. Pat. No. 5,331,824 to Miller et al discloses a refrigeration system using ammonia as a refrigerant and featuring supplementary cooling by a tube containing liquid nitrogen placed in the vapor space.

None of the inventions disclosed in these patents achieve the efficiency that is an object of this invention.

THE INVENTION

Summary

This invention is directed toward optimizing the efficiency of interaction of three cycles. One cycle is the refrigerant cycle in which the the refrigerant is converted from the liquid state to the gaseous state and back to the liquid state. The second cycle is the water cycle in which water is converted from a liquid state containing salt, to a vapor state and then back to the liquid state in which salt has been removed. The third cycle is the heat cycle in which heat is cycled between the refrigerant and water with sufficient expenditure of energy to maintain the cycles.

The object of this invention is to achieve optimum efficiency in maintaining these cycles such that the only expenditure of energy would be the energy difference between the initial product, which is salt water and the end product which is potable water. The energy gain is expressible as a difference between the chemical potentials of equal volumes of fresh water and salt water. This energy gain is supplied by a pump which compresses the gaseous refrigerant to the liquid state.

The invention is directed toward pumping refrigerant vapor, preferably ammonia, from a first reservoir to condensation in a second reservoir so as to generate heat. The heat generated is used to heat seawater in a third reservoir causing generation of water vapor from the third reservoir to pass through an array of vapor traps and condense into a fourth reservoir. The condensing water vapor releases heat which is conducted to the first reservoir containing the refrigerant so as to support the vaporization of the liquid refrigerant. A metering system transfers an amount of liquid refrigerant from the second reservoir back to the first reservoir to maintain balance of the refrigerant between the first and second reservoirs.

A feature of this invention is an array of vapor traps that is constructed for optimum efficiency to convert vapor issuing from a sea water reservoir to a reservoir containing the potable water. The vapor traps are essentially channel-ducts which, in one embodiment are cooled by incoming seawater to promote condensation of the water vapor. Means are also provided for controlling the level of seawater and freshwater in the vapor traps for most efficient operation.

Another feature of this invention is a pump that is entirely enclosed in the second reservoir of liquid refrigerant such that all of the energy generated by the pump is used either to compress the refrigerant or to heat the liquified refrigerant.

The invention also features the inclusion of controls whereby seawater enters your system with a given concentration of salts and would be discharged from the system with another (heavier)) concentration of salts and control of an optimum pressure in the compression chamber, the evacuation chamber and the vapor-water conversion chamber to provide greatest efficiency of the process.

DISCUSSION OF A PREFERRED EMBODIMENT

Figure 1:
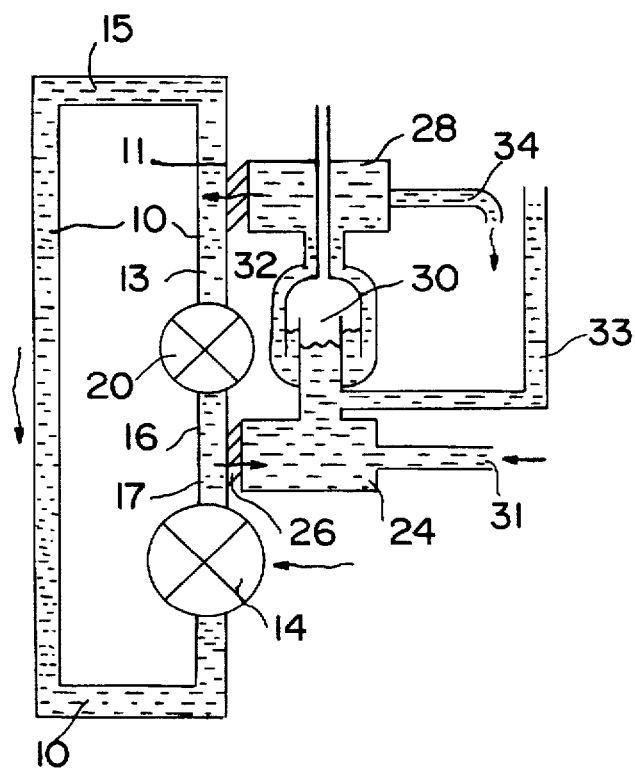
FIG. 1 is a diagram illustrating the refrigerant cycle, water cycle and the heat exchange.

Turning now to a discussion of the drawings FIG. 1 is an illustration of the interaction of the water cycle, the refrigerant cycle and the heat cycle. In the refrigerant cycle, there is shown section 10 where liquid refrigerant evaporates to a refrigerant vapor. The boundary 11 between liquid refrigerant 13 and refrigerant vapor 15 is shown. Refrigerant is circulated in section 10 by vapor pump 14 which pumps the refrigerant vapor from region 15 into region 16 where the refrigerant vapor condenses under the pressure provided by the vapor pump 14 to a liquid refrigerant 17. The liquid refrigerant 17 is recirculated back to region 13 by metering valve 20. Metering valve 20 admits an equal amount of liquid refrigerant back to region 13 as is introduced by vapor pump 14 into region 16.

Salt water is admitted into region 24. Partition 26 allows passage of heat that has been released by condensation of the refrigerant in region 16 to heat the sea water in region 24 This results in the generation of water vapor in trap 30. The water vapor passes through trap 30 (that permits passage of water vapor but not liquid water) into region 28. A partition 32 between region 28 and section 10 allows heat from the water vapor in region 28 to heat the liquid refrigerant in region 10 and thereby promote the evaporation of the liquid refrigerant in section 10 and condensation of the water vapor to potable water in region 29.

The system is designed with the objective that 100% efficiency is achieved when the only energy put into the system is electrical energy supplied to operate the pump which equals the only energy taken out of the system which is the difference in chemical potential between the salt water and the desalinized water.

Figure 2:
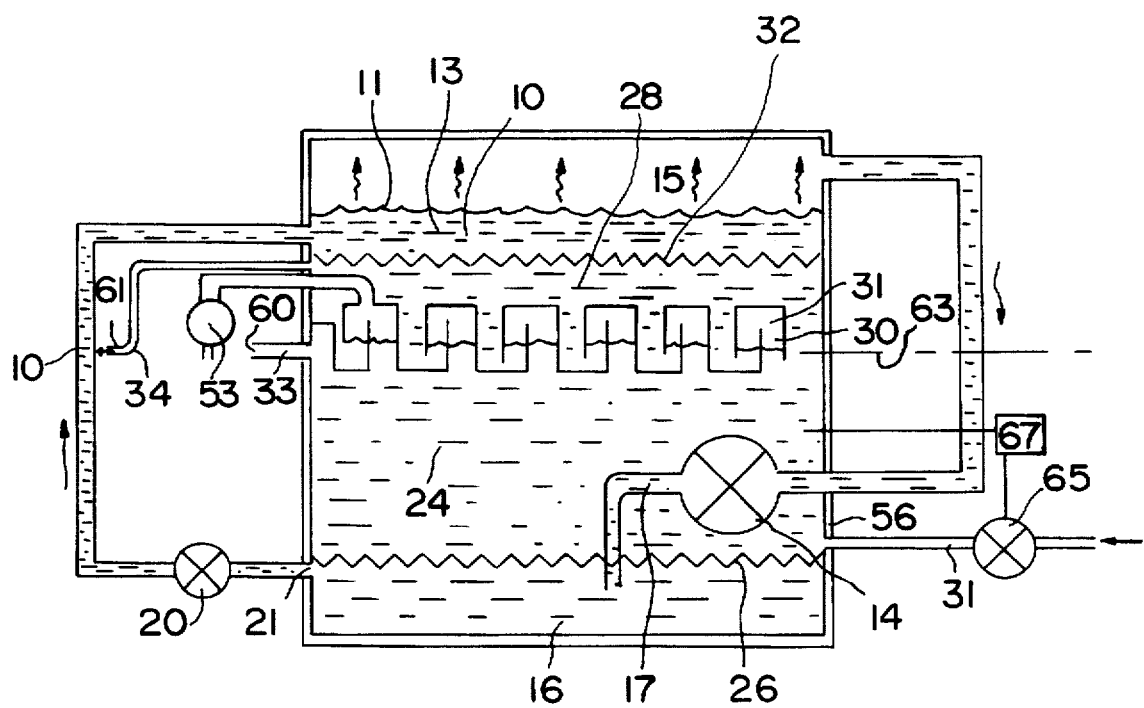
FIG. 2 shows details of the complete apparatus.

Details of the construction of the apparatus are shown in FIG. 2.

Figure 3:
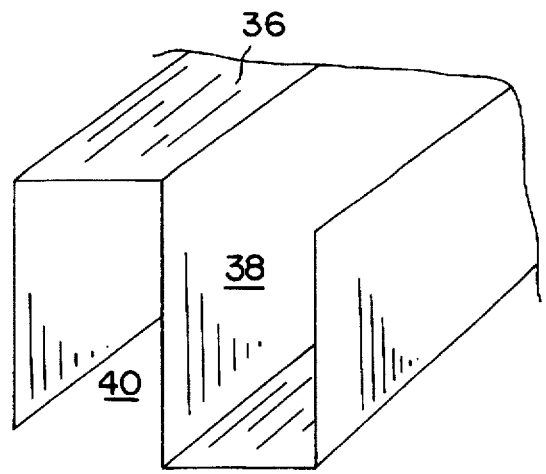
FIG. 3 shows details of a vapor trap.

The vapor trap is made of an array of interleaved panels. FIG. 3 shows one panel 36 bent to form channel 38 and a paired channel 40 which shares a common side with channel 38. Each channel is seen to be concave when viewed fro the other channel so that the bent panel 36 is seen to have a cross section of a squared letter "S".

Figure 4:
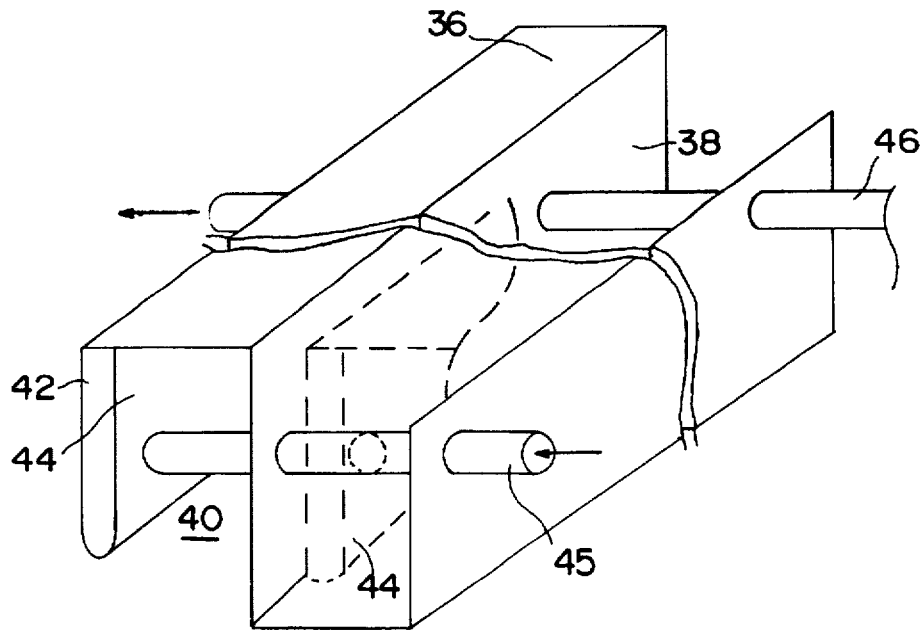
FIG. 4 shows details of a second vapor trap.

FIG. 4 shows another embodiment of the vapor trap channels of FIG. 3. in that each channel is provided with a duct 42 which conducts incoming salt water. The duct 42 is also formed by bending panel 36. Duct 42 is closed off at each end and has a pair of tubes 45 and 46, one tube at each end so that unheated seawater enter through one tube 44 (see arrow) passes through all of the ducts 42 of the array, and then passes into region 24. The side 44 of duct 42 is directly exposed to the water vapor thereby augmenting condensation of the vapor and heating the incoming seawater.

Figure 5:
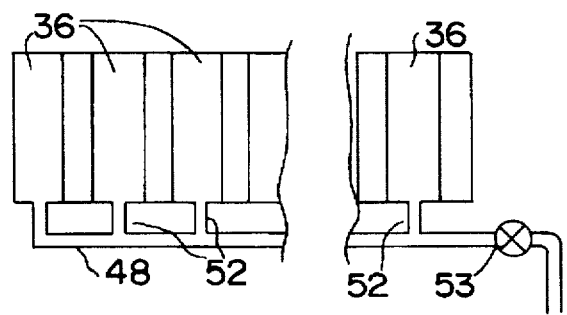
FIG. 5 shows details for maintaining vapor pressure in the vapor traps.

The volume of the regions 31 of the vapor traps 30 (see FIG. 2) occupied by the water vapor must be carefully maintained in order that salt water not inadvertently mix with the potable water. This is accomplished by the tube manifold shown in FIG. 5 with pressure control valve 53, the positioning of the exit end 60 of the discharge tube 33 for the salt water, and positioning the exit end 61 of the discharge tube 34 for the potable water. The pressure control valve 53 is a one way valve that admits air into the vapor lock chamber when pressure in vapor lock 30 falls below ambient pressure. Exit end 60 of the discharge tube 33 for seawater and exit end 61 of the discharge tube for potable water. All of these features are shown in FIG. 2 but the pressure control valve is shown to better advantage in FIG. 5. FIG. 5 shows a manifold of tubes 48 with each member 52 communicating with a respective vapor trap 36. A relief valve 53 maintains the pressure in the vapor region 31 of each trap at atmospheric pressure thereby maintaining the boundary of the salt water separate from the boundary of the potable water in the vapor traps. The extensions 60 and 61 (FIG. 2) are positioned on a horizontal line 63 which is the level of the saltwater and potable water in the vapor lock. A sensor 67 senses conductivity of the salt water and when the conductivity increases to a predetermined value as the salt concentration increases, then a signal from sensor 67 turns on pump 65 to admit more salt water into reservoir 24. Under the arrangement shown in FIG. 2, the pressure in the vapor lock will be ambient.

Figure 6:
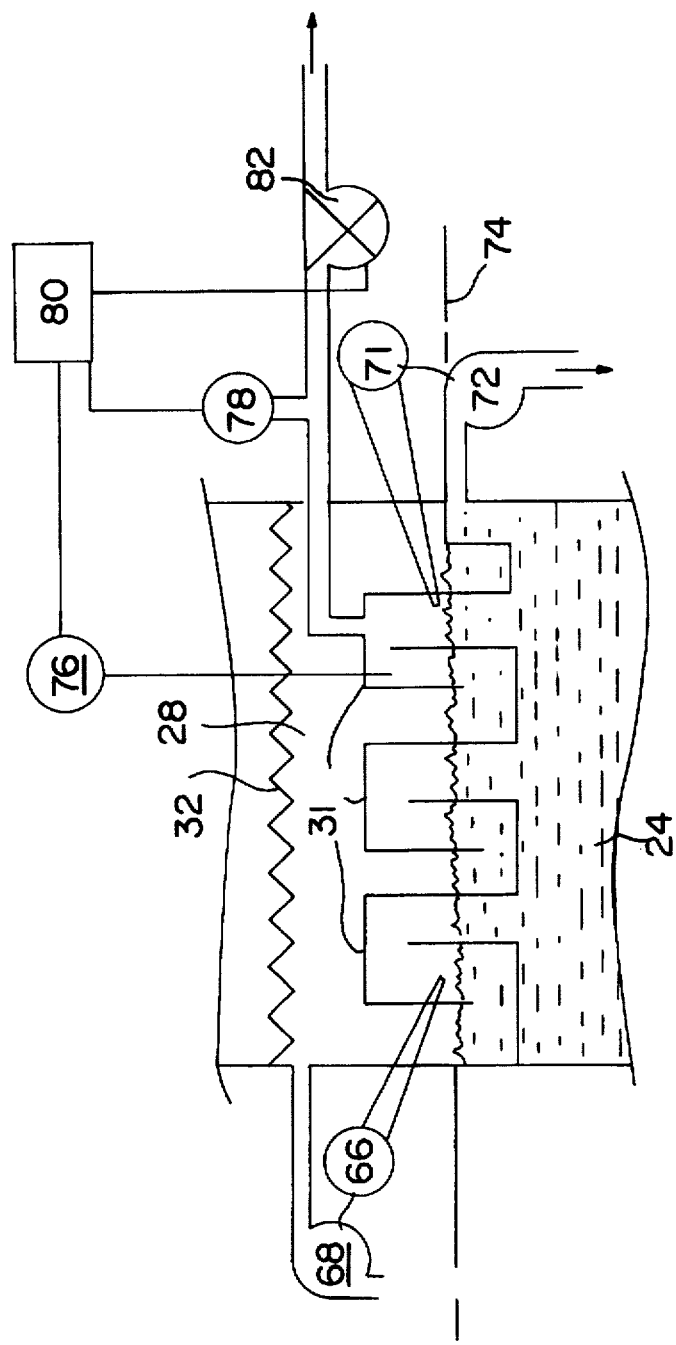
FIG. 6 shows an arrangement for controlling vapor pressure in the vapor lock.

In order to increase the evaporation rate of the water, an arrangement (cutaway) shown in FIG. 6 is used to maintain a pressure in the vapor lock that provides greatest rate of water transfer from saltwater to potable for a given temperature of the vapor in the vapor lock. Three ducts 31 are shown separating the potable water 28 from the salt water 24. A level sensor 71 senses the level 74 of salt water 24 in the vapor lock 31 and when the salt water level rises above a predetermined location, sensor 71 turns on pump 72 to reduce the level of the salt water. Similarly, sensor 66 senses the level of potable water 28 in the vapor lock and when the level rises above a preset location, sensor 66 turns on pump which discharges potable water. Sensor 76 measures the temperature at a location proximal to the boundary between the seawater and water vapor in the vapor lock and sensor 78 measures pressure in the vapor lock 31. The temperature and pressure are relayed to controller 80. Controller 80 has a lookup table listing the vapor pressure of water vs. temperature. received from sensor 76. The presence of air mixed with water vapor in the vapor trap diminishes the efficiency of the water cycle. Therefore, when the measured vapor pressure exceeds the vapor pressure listed in the lookup table, controller 80 turns on pump 82 which purges out the entrapped air. the result is that the entire makeup of the gas in the vapor trap is water vapor which is the condition of the system providing greatest efficiency.

Various modifications of the invention may be suggested after reading the specification and studying the drawings which are within the scope of the invention.

For example, the entire outside surface of the apparatus is covered with insulation 56 to minimize dissipation of heat for any purpose other than to vaporize water or refrigerant. The insulation material may be a polypropylene foam or other suitable material.

The heat transfer panels 32 and 26 are preferably corrugated sheets of stainless steel or electroless nickel plated on either copper or aluminum. For most effective transfer of heat, heat transfer surfaces 26 and 32 are slanted to prevent accumulation of air. Exit tube 34 for drawing potable water from region 28 is located at the uppermost end of the corrugations of heat transfer surface 32. Therefore, any air that would otherwise collect under the heat transfer panel 32 will be drawn off through discharge tube 34. Similarly, the exit tube 29 connects the uppermost part of section 16 to the upper refrigerant reservoir 19 in order that refrigerant vapors not prevent heat transfer across heat transfer panel 32.

The refrigerant may be any one of a number of appropriate compounds including ammonia and freon.

The pump 14 is enclosed in region 10 so that any heat generated by the pump promotes evaporation of the refrigerant in region 10.

The conductivity sensor and valve means for maintaining the conductivity of the salt water within predetermined limits by simultaneously adding fresh searwater and draining salt enriched sea water from the apparatus may be independent of the means for controlling water levels in the vapor lock.

In view of variations suggested by the specification, I wish to define the scope of my invention by the appended claims.

I claim:

1. A desalinization apparatus which comprises:

a first reservoir means for holding liquid refrigerant;

a second reservoir means for holding liquid refrigerant and refrigerant vapor such that said liquid refrigerant is in one section of said second reservoir and said refrigerant vapor is in another section of said second reservoir;

a vapor pump means for pumping a first amount of refrigerant vapor from said another section of said second reservoir into said first reservoir such that pressure in said first reservoir increases to where said first amount of refrigerant vapor pumped into said first reservoir is liquified;

said vapor pump means positioned inside said first reservoir whereby heat generated by said vapor pump flows into liquid refrigerant in said first reservoir;

a transfer means connected to said first reservoir and said one section of said second reservoir for transferring a second amount of liquified refrigerant in said first reservoir to said one section of said second reservoir wherein said first amount equals said second amount;

a third reservoir means for holding salt water;

a fourth reservoir means for holding potable water;

a vapor trap means for permitting water vapor generated in said third reservoir to pass through said vapor trap and condense in said fourth reservoir;

a first heat conducting partition arranged as a common side of said first and third reservoirs operably arranged and constructed such that heat generated in said liquid refrigerant in said first reservoir is enabled to flow into, salt water in said second reservoir;

a second heat conducting partition arranged as a common side of said second and fourth reservoir operably arranged and constructed such that heat generated in potable water in said second reservoir is enabled to flow into liquid refrigerant in said second reservoir.

2. The desalinization apparatus of claim 1 wherein said vapor trap means comprises:

an array of ducts, each duct being a pair of elongated channels such that each channel shares one side with its paired channel and another side of each channel is distal from said another side of said paired channel and each said channel is concave as seen from said other paired channel;

each duct arranged in said array of ducts parallel to a neighboring duct with each duct having said another side positioned between said shared side and said one side said of said neighboring duct such that water vapor generated on one side of said array of ducts is enabled to pass through said array of ducts to an opposite side of ducts;

means for maintaining a barrier of water vapor in said channels such as to prevent salt water on one side of said array of ducts from passing through said array of ducts and mixing with potable water on another side of said array of ducts.

3. The apparatus of claim 1 wherein said means for maintaining comprises:

a one way valve means for admitting air to said vapor trap when gas pressure in said vapor trap decreases below a preset value;

a first conduit having one end communicating with said fourth reservoir and an open end positioned external to said fourth reservoir at a predetermined level where vapor condenses to potable water in said vapor trap;

a second conduit having one end communicating with said third reservoir at a required second level where it is intended that water vapor evaporates from said salt water and an open end positioned at said second level external to said third reservoir where salt water is discharged from said system;

a third conduit connected to said third reservoir for adapted for admitting salt water into said third reservoir.

4. The desalinization apparatus of claim 3 which comprises:

a conductivity means for eliciting a conductivity of a liquid signal responsive to conductivity of said salt water in said third reservoir;

a valve means mounted on said third conduit for admitting salt water into said third water responsive to said conductivity signal for admitting salt water into said third reservoir when conductivity of said salt water in said third reservoir increases above a predetermined value.

5. The desalinization apparatus of claim 4 wherein said first, second third and fourth reservoirs are contained in one container and said container has an outer surface that is insulated to prevent flow of heat from inside said container to outside said container.

6. The desalinization apparatus of claim 1 wherein said insulation material is a plastic foam.

7. The desalinization apparatus of claim 6 wherein said first and second heat conducting partitions are corrugated sheets of metal selected from a group of metal consisting of stainless steel, electroless nickel plated copper alloy, electroless nickel plated aluminum.

8. The desalinization apparatus of claim 2 wherein said another side of each said channel is a conduit communicating with said other conduits and adapted for admitting salt water into said third reservoir such as to aid in the condensation of water vapor to potable water in said vapor trap.

9. The desalinization apparatus of claim 3 wherein said refrigerant is ammonia.

10. The desalinization apparatus of claim 1 wherein said refrigerant is freon.

11. The desalinization unit of claim 1 which comprises:
- a first conductivity sensor means adapted for emitting a first signal responsive to level of salt water in said vapor lock;
- a pump responsive to said first signal adapted for maintaining a predetermined level of salt water in said vapor lock;
- a second conductivity sensor means adapted for emitting a second signal responsive to a predetermined level of potable water in said vapor lock;
- a pump responsive to said second signal for maintaining a level of potable water in said vapor lock;
- a thermometer means adapted for emitting a temperature signal responsive to a temperature of vapor in said vapor lock;
- a pressure sensor means adapted for emitting a pressure signal responsive to vapor pressure in said vapor lock;
- a vacuum pump means adapted for lower pressure in said vapor lock;
- a controller means having a lookup table of vapor pressure vs. temperature for determining a target pressure in said lookup temperature corresponding to said temperature signal and energizing said vacuum pump to reduce vapor pump in said vapor lock to said target pressure.

12. A method for desalinizing salt water which includes in operable order the steps:
   (a) pumping refrigerant vapor from a first reservoir to a second reservoir wherein pressure in said second reservoir is such as to cause refrigerant vapor pumped into said second reservoir to condense thereby generating heat in said second reservoir;
   (b) admitting salt water into a third reservoir wherein said third reservoir is arranged to receive said heat generated in said second reservoir such that seawater in said third water is evaporated to water vapor and passes through a vapor trap into a fourth reservoir
   (c) contacting said fourth reservoir with said first reservoir such that heat generated by water vapor condensing in said fourth reservoir is absorbed by liquid refrigerant in said first reservoir such as to aid in evaporation step (a);
   (d) measuring the temperature at a location proximal to a boundary between seawater and vapor in said vapor lock;
   (e) activating a vacuum pump to adjust pressure in said vapor lock corresponding to a pressure which is a predetermined value of pressure of water vapor for the measured temperature.

\* \* \* \* \*